July 22, 1969  A. GOLDHOFER  3,456,820
MOVABLE LOADING AND UNLOADING DEVICE
Filed March 7, 1968  2 Sheets-Sheet 2
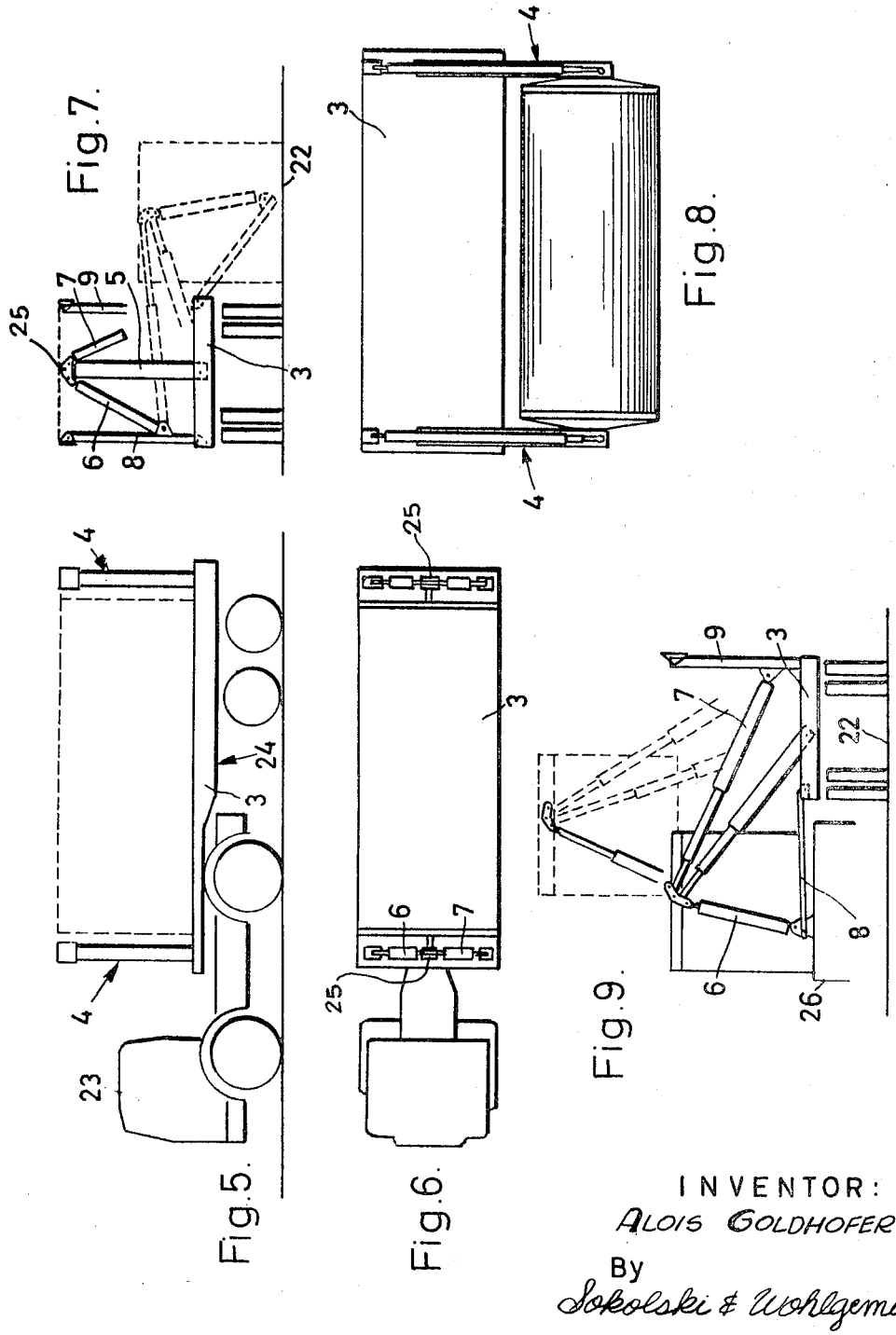
INVENTOR:
ALOIS GOLDHOFER
By
Sokolski & Wohlgemuth
Attorney United States Patent Office 3,456,820
Patented July 22, 1969

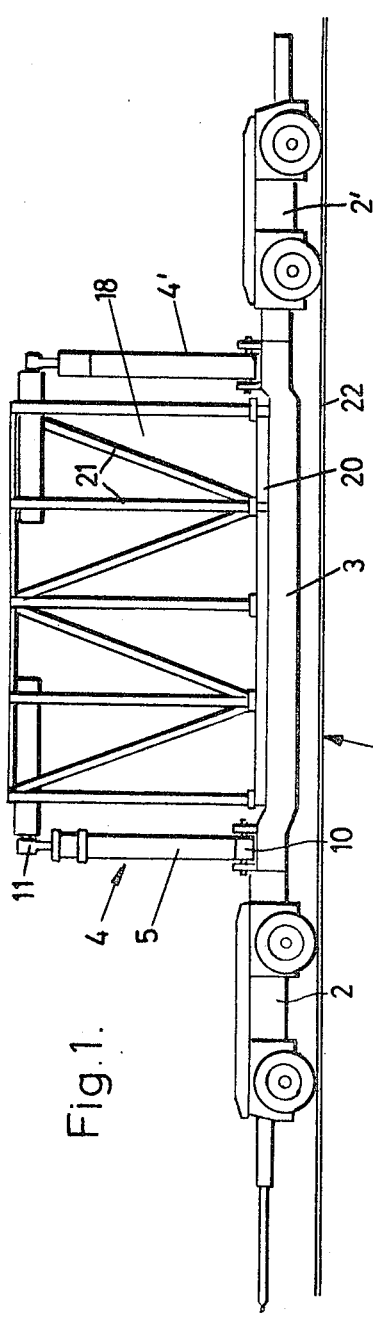

3,456,820
MOVABLE LOADING AND UNLOADING DEVICE
Alois Goldhofer, 894 Amendingen, near
Memmingen, Germany
Filed Mar. 7, 1968, Ser. No. 711,308
Claims priority, application Germany, May 5, 1967,
G 50,023
Int. Cl. B60p 1/48
U.S. Cl. 214—77                                                  6 Claims

ABSTRACT OF THE DISCLOSURE

A loading and unloading device having fluid actuated jacks medially disposed at each end of a movable load platform and pivotally connected thereto to move at right angles to the longitudinal axis of the platform. The jacks form extendable jibs, with the free end of each jib pivotally engaging two piston and cylinder assemblies, one on each side thereof. The other end of each assembly is slidably supported on a bar which is itself pivotally connected on the side of the platform.

---

The invention concerns a loading and unloading device for bulky articles such as prefabricated components, large containers, or pallets with heavy loads, and consists essentially of an arrangement of hydraulically actuatable piston and cylinder assemblies arranged to move transversely to the longitudinal axis of a vehicle or trailer on which the device is mounted.

Arrangements to perform this function are already known. It has, for example, already been proposed to mount tippable, hydraulically actuated bridges on the ends of a load platform which are pivoted for loading and unloading loads.

It is also known to provide hydraulically actuated jibs with which the load is lifted and swung away by lateral pivoting thereof. In this design, however, loading and unloading is possible only from one side, which often entails considerable difficulty in the case of narrow access roads to the goods destination.

These two said designs have the disadvantage that during the loading and unloading operation the vehicle or trailer respectively has to be supported as by means of trestles, extendable supports or the like, so that additional support devices are necessary.

The object of the present invention is to provide a loading and unloading device which avoids the above disadvantages and provides rapid and safe operation.

According to the present invention a loading and unloading device for bulky articles, such as prefabricated parts, large containers or pallets with heavy loads, comprises fluid actuated jacks located one at each end of a load platform of a vehicle or trailer and pivoted so as to be movable at right angles to the longitudinal axis of the said vehicle in which the said jacks form extendable jibs, the free end of each jib pivotally engaging with two pneumatically or hydraulically actuated piston and cylinder assemblies, one on each side thereof, the other end of each assembly being slidably supported on a bar which is itself pivoted on one side of the load platform.

To withstand the longitudinal and transverse forces a tubular support is provided, which is also telescopic. Fluid actuated pistons allow the load to be lifted or unloaded from both sides of the vehicle or trailer which is of considerable advantage when small building sites and storage places are concerned.

A further feature of the invention concerns platform supporting bars. These may be swung out and placed in position on the ground alongside the vehicle. During raising or lowering the load the piston is supported by the bar transmitting the load weight to the ground, so that no additional extensible supports or pneumatic or hydraulic equipment is required.

The supporting bars are thus swung out on the side to which the load is lowered or raised.

Since the bars on the side of the platform over which the load does not pass are fixed in position by both studs or the like, the pistons engaging therewith have firm points of engagement for lifting and lowering the load. The free ends of the bars have supporting shoes hingedly arranged thereon. This provides adequate support even on soft terrain.

The fluid actuated pistons have pivoted sliding shoes which are in sliding engagement with the bars. By this means one piston momentarily acts to steady the jib ensuring that the vehicle is steadily and uniformly loaded during load transference, while the other piston causing the lifting and lowering movement has a fixed pivotal point on the locked supporting bar.

To obtain a reliable connection between the bars and the sliding shoes, the latter at least partly surround the bars and are guided thereon.

In one embodiment the tubular support or jib carries a bearing member on its free end for the pivotal mounting of pallets. In addition, a stub may be provided at the upper end of each jib or a load carrying beam may extend between the jibs, with chain or cable suspension means.

Preferably the fluid actuated pistons form an acute angle relative to one another at the free end of the jib structure.

Further features in accordance with the invention will be apparent from the following description and in the accompanying drawings, but the invention is in no way to be limited to the embodiments shown, other than as defined by the appended claims.

In the figures:

FIG. 1 is a vehicle or trailer for transporting large bulky articles in side view having a loading and unloading device mounted thereon;

FIG. 2 is a front view of the vehicle of FIG. 1, the loading and unloading device being shown in the inoperative position (driving position);

FIG. 3 shows the loading and unloading device in a working position and

FIG. 4 shows a pallet being unloaded,

FIG. 5 is a truck joined to an articulated trailer having a loading and unloading device, and FIG. 6 is a plan view of the combination of FIG. 5.

FIG. 7 is a front view of the loading and unloading device of FIG. 5, the position of an unloaded large container being shown in broken lines, FIG. 8 is a plan view of the articulated trailer with large container unloaded and FIG. 9 shows a large container being removed from a railway truck or a loading ramp.

Referring to FIG. 1, a transport vehicle or trailer 1 comprises bogies 2, 2' and a load platform 3. At the ends of the load platform 3, with respect to the direction of travel of the vehicle 1, there are loading and unloading devices 4, 4'.

Each loading and unloading device 4, 4' comprises a tubular support or jib 5 arranged in the medial plane of the load platform 3, two pneumatically or hydraulically actuated pistons 6, 7, and two supporting bars 8, 9.

The jib 5 is pivoted at point 10 on the load platform so as to be swingable across the platform. At their free ends the jibs support bearing members 11 for attachment to heavy loads or to pallets.

This bearing member 11 has downwardly extending plates 12 on which the pistons 6 and 7 are pivotably secured. The piston cylinders carry shoes 13, 14 on their free ends and, pivotably connected thereto, which are in sliding engagement with the supporting bars 8, 9.

The supporting bars 8, 9 are pivoted on the edges of the load platform 3, and on their free ends have pivotably mounted supporting shoes 15, 16. To lock the supporting bars 8, 9 in their vertical position, studs, pins or the like 17 are provided.

A pallet 18 to be moved comprises a plate 20 receiving the load 19 and a supporting framework 21 which is adapted to be releasably secured to the bearing member 11. The pallet 18 is freely pivotally suspended from the bearing member 11.

The unloading procedure is as follows:

During travel in the loaded state the apparatus 4 is in the position as shown in FIG. 2. If the articles being conveyed are now to be unloaded, then first of all the supporting bars 9 on the unloading side are extended by means of pistons 7 until the supporting shoes 16 are supported on the terrain 22 alongside the vehicle as seen in FIG. 3. This supports the vehicle without the use of an additional supporting structure. The opposite supporting bars 8 remain in their locked position.

When the supporting bars 9 are extended, the sliding shoes 14 slide to a position close to the shoes 16, so that adequate load support and platform stabilisation are provided. Due to the fact that each of the supporting shoes 13 engage one of the supporting bars 8 these supporting bars being locked to the load platform, a fixed fulcrum is obtained for load lifting.

Now pistons 6 are actuated and the load or pallet 18 is lifted along a circular path at a radius corresponding to the extended length of piston 7 as seen in the dotted portion of FIG. 3. To lower the pallet, as soon as the pistons 6 have been completely extended, pistons 7 are gradually retracted to such an extent as to lower the pallet 18 or the conveyed article on to the ground 22. The pallet may now be disengaged, possibly for later conveyance by a crane to a building site.

FIGURES 5 to 9 show an articulated vehicle with traction motor 23 and trailer 24 on which a loading and unloading device 4, 4' is mounted. In this embodiment adjustable heads 25 are provided on the free ends of the tubular supports 5 for attachment to large containers. Securing cables, chains or the like may be provided on these heads 25. It is, of course, also possible to convey other bulky articles besides containers, such as prefabricated parts, or pallets carrying piece goods.

It is of course possible to provide an inwardly directed horizontal stub on the free ends of each of the jibs to receive the articles being transported, the load being suspended therefrom by means of cables. It would also be possible to arrange a bar extending the whole way between the front and rear jibs. Large containers may be suspended directly from the jibs.

FIG. 9 shows a large container being off-loaded from a railway truck 26 to an articulated trailer. The operation may of course also be carried out from a platform of a warehouse. The loading procedure is the reverse of the unloading procedure.

A loading and unloading device in accordance with the invention may be provided on a rail-going vehicle, or it may be stationary, and located, for example, near a warehouse. A device in accordance with the invention has considerable advantage over known devices in shifting and transporting various articles.

While the device of this invention has been described and illustrated in detail, it is to be clearly understood that this is intended by way of illustration and example only.

What is claimed is:
1. A loading and unloading device comprising:
 a vehicle load platform,
 an extendable jack medially disposed at each end of said platform, each jack pivotally connected to said platform to move normal to the longitudinal axis of the vehicle,
 a support bar pivotally affixed adjacent to each corner of said platform,
 a fluid actuated piston and cylinder assembly connected between each bar and the associated jack at its end of the platform, each assembly being pivotally affixed to the free end of said jacks while being slidably connected to said support bars.
2. The device of claim 1 further comprising:
 means for locking said support bars in a fixed position.
3. The device of claim 1 further comprising:
 hinged shoes affixed to the free ends of said support bars.
4. The device of claim 1 wherein said assemblies are slidably connected to said support bars by slidable shoes pivotally connected to said assemblies and in sliding engagement with said support bars.
5. The device of claim 1 wherein each jack is connected at its free end to a load bearing member whereby pallets can be mounted thereon.
6. The device of claim 1 wherein in a retracted normal position said bars and jacks are disposed vertically upward from said platform with said assemblies extending from the exposed free end of said jacks to adjacent the base of said bars where said bars are pivotally affixed to said platform.

References Cited
UNITED STATES PATENTS 3,174,630    3/1965    Tantlinger et al. _____ 212—8
3,249,235    5/1966    Roberts _____ 212—8

GERALD M. FORLENZA, Primary Examiner

ROBERT J. SPAR, Assistant Examiner

U.S. Cl. X.R.
212—145